United States Patent [19]

Mitchell et al.

[11] Patent Number: 4,593,350
[45] Date of Patent: Jun. 3, 1986

[54] DISTRIBUTED PROCESSOR WITH PERIODIC DATA TRANSFER FROM EACH MEMORY TO LIKE ADDRESSES OF ALL OTHER MEMORIES

[75] Inventors: Renzo D. Mitchell, Cherry Hill; Don N. Thomas, Haddonfield, both of N.J.; Richard J. Smith, Fairfax Station, Va.

[73] Assignee: RCA Corporation, Princeton, N.J.

[21] Appl. No.: 498,101

[22] Filed: May 25, 1983

[51] Int. Cl.[4] .............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,648,256 | 3/1972 | Paine et al. | 364/200 |
| 3,755,785 | 8/1973 | Kirk | 364/200 |
| 3,810,114 | 5/1974 | Yamada et al. | 364/200 |
| 3,919,693 | 11/1975 | Anderson | 364/200 |
| 4,050,097 | 9/1977 | Miu et al. | 364/200 |
| 4,085,448 | 4/1978 | Kogge | 364/900 |
| 4,228,496 | 10/1980 | Katzman et al. | 364/200 |
| 4,229,792 | 10/1980 | Jensen et al. | 364/200 |
| 4,231,086 | 10/1980 | Tarbox et al. | 364/200 |

*Primary Examiner*—James D. Thomas
*Assistant Examiner*—David Y. Eng
*Attorney, Agent, or Firm*—Joseph S. Tripoli; Robert L. Troike; William H. Meise

[57] ABSTRACT

A plurality of computer stations each includes a data processing computer capable of having its data processing function inhibited or halted by a halt signal applied to a halt input terminal, and each also includes a random access memory (RAM). The plurality of computer stations are interconnected by a bus system and controlled by a bus controller for allowing the periodic interchange of data among the random access memories of the computer stations. The bus controller periodically generates a halt signal which is applied in common to the halt input terminal of each computer station and which stops the processing of data by each data processing computer during the interchange of data. During the time of each halt signal, the bus controller generates in time sequence computer station address signals which are applied in common over the bus system to an address decoder associated with each computer station. The decoder associated with the particular computer station being addressed produce a second output signal, and all the other decoders produce a second output signal. Thus, the bus controller periodically accesses each computer station. During the time in which each computer station is accessed, the bus controller produces in predetermined time sequence one or more word addresses, each representing the memory location of a word to be read from the RAM of the computer station which is addressed and also representing the memory location into which the word is to be written into the RAMs of those computer stations which are not addressed. The bus controller also generates read/write signals in conjunction with each word address. A first gating circuit associated with each computer station responds to the simultaneous occurrence of the halt and read/write signals and the first output signal of the decoder to generate a read signal for causing the RAM associated with the addressed computer station to read, and also responsive to the second output signal from the decoder to cause the RAM to write when the computer station is not addressed. A second gating circuit is coupled to each decoder, to each RAM and to the bus and is responsive to the first output signal from the decoder to couple the word read therefrom to a particular portion of the bus system, and is responsive to the second output signal from the decoder to couple signal from the particular portion of the bus to the RAM for writing in.

1 Claim, 6 Drawing Figures

DISTRIBUTED PROCESSOR WITH PERIODIC DATA TRANSFER FROM EACH MEMORY TO LIKE ADDRESSES OF ALL OTHER MEMORIES

BACKGROUND OF THE INVENTION

This invention relates generally to a distributed microprocessor system having a common bus and more particularly, to such a system requiring high rates of data transfer between microprocessors on the common bus and further requiring transfers of the same data between a number of microprocessors in the system.

Certain functions which are processed by data processors are repetitive computations done at a prescribed time rate and within absolute time frame restrictions. An example of such a repetitive computation occurs in radar systems in which the range signals (signals reflected from different range distances) are received repetitively at a prescribed rate and within substantially absolute time frames. The processing of the received range signals can be done in a distributed microprocessor system with each of the processors receiving and processing different characteristics of commonly received data.

The present invention provides a high speed bus system designed and implemented for a distributed microprocessor system in which the microprocessors are periodically halted from processing data to permit the transfer of data between microprocessors during each halt.

SUMMARY OF THE INVENTION

In accordance with a preferred form of the invention there is provided, in a computer system having a plurality of computer stations each having a computer, a halt interrupt function and a random access memory (RAM), a method of interconnecting the computer stations for communication therebetween and comprising the steps of periodically halting the internal processing of data of all of the computers of the computer stations for a predetermined period of time, reading onto a common bus the data stored in predetermined word locations of successively selected RAMS during the predetermined period of time, and writing the data read from the selected RAM into the non-selected RAMS during the predetermined period of time.

DETAILED DESCRIPTION OF THE INVENTION

Figure 1:
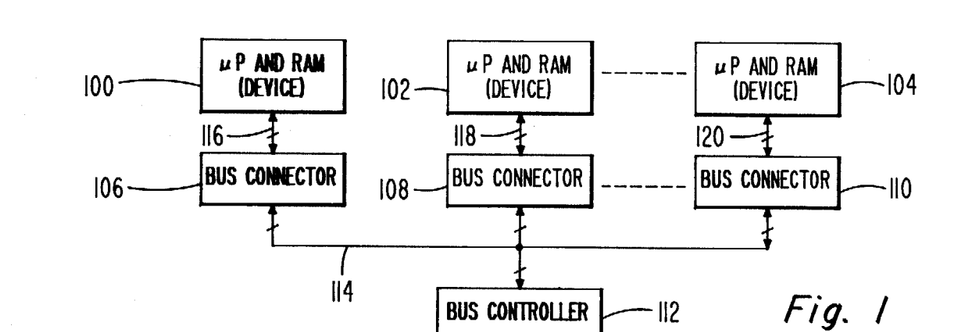
FIG. 1 is a block diagram of a simplified form of the invention.

Referring now to FIG. 1 there are shown three devices 100, 102, and 104 (which can be microprocessors and RAMS) each connected to one of the bus connectors 106, 108, and 110, respectively, and unique thereto. A common bus controller 112 supplies control signals, addresses, and timing signals via common bus 114 to bus connectors 106, 108, and 110 via common bus 114 which, in turn, access the random access memories (RAM) of the microprocessors 100, 102, and 104 for read or write functions.

In the operation of the system there are periodic halt intervals, as mentioned above, during which each of the devices 100, 102, and 104 are sequentially accessed by device addresses supplied from bus controller 112 to the bus connectors 106, 108, and 110. Word addresses are also sequentially supplied from bus controller 112 to the RAMS of the processors 100, 102 and 104. These word addresses are the same for all of the processors during the time that any given processor is being accessed by a device address. However, only the RAM of that device which is being accessed will have the data read out from the accessed word locations of its RAM. All of the remaining RAMS will have those words which were read out from the accessed device written therein and in the same word locations from which the words were read from the accessed device.

For example, when the processor 100 is addressed through bus connector 106, the bus controller 112 will also access certain predetermined word locations in the RAM of processor 100, and in accordance with the stored program being executed by the controller. When the device 102 is subsequently addressed by bus controller 112 through bus connector 108 certain word locations in the RAM thereof will be sequentially accessed by bus controller 112.

The particular word locations accessed (read out) in the RAM of processor 102 will usually be different than those accessed (read out) in the RAM of processor 100 when processor 100 is being addressed. However, it should be noted, as stated above, that when the RAM of any particular processor is accessed for the reading out of data, such as processor 102, then the same word locations in all of the processors will be accessed (for the writing in of data) by bus controller 112.

In summary, the purpose of the foregoing arrangement is that when any given processor is accessed it becomes a transmitting processor and the contents of all of the word locations accessed in the RAM of the transmitting processor are read from such transmitting processor RAM and written into the same word locations of the RAMS of the remaining processors. The foregoing is an essential feature of the invention. The actual reading of a word from the RAM of a given transmitting processor is accomplished by a read/write pulse as shown in timing waveform D of FIG. 2, as will be discussed in more detail later. It is apparent that sufficient settling time must be allowed in the accessing of the word locations in the RAM of a given processor before the contents thereof are read therefrom. Accordingly, the read/write pulses of waveform 2D are relatively narrow and occur somewhere in the middle of the accessing time of word locations in the RAM of the accessed microprocessor device, as shown in timing waveform 2C.

It is to be noted that the devices 100, 102 and 104 of FIG. 1 are accessed sequentially during each halt interval, which typically occurs every several milliseconds for a short time duration which is sufficiently long to perform the accessing of each of the devices in the system in the manner described generally above. For example, the processors can be halted every 10 milliseconds for a time period not greater than 1 millisecond. Thus, about 10% or less of the processor time will be occupied by halt signals.

Figure 3:
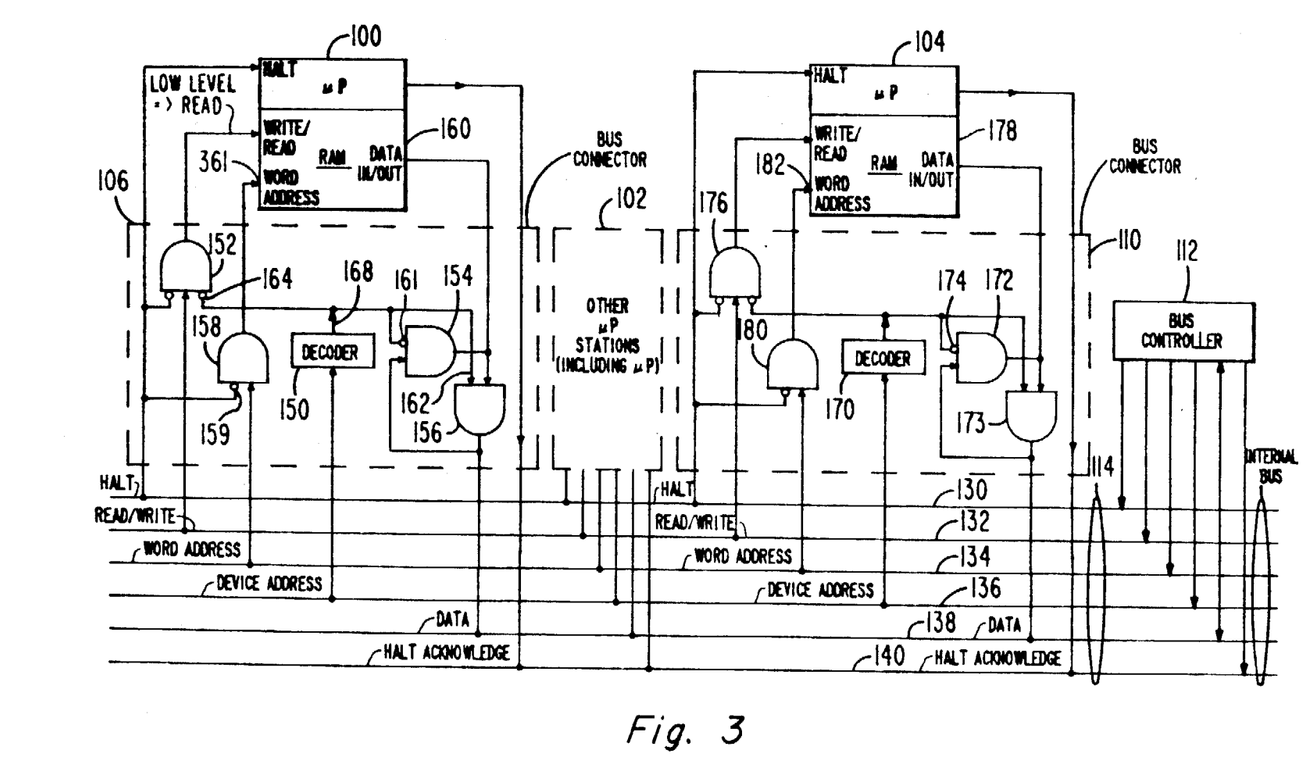
FIG. 3 is a more detailed combination block and logic diagram of the simplified block diagram of FIG. 1.

Referring now to FIG. 3 there is shown therein a more detailed diagram of the generalized block diagram of FIG. 1 with corresponding parts being identified by the same reference character. Thus, in FIG. 3, the microprocessors (devices) 100, 102 and 104 correspond to the microprocessors (devices) 100, 102 and 104 (the microprocessors including the RAMs) of FIG. 1. The bus 114 of FIG. 3, shown as a 6 separate buses, three of which are multilead buses, corresponds to bus 114 of FIG. 1. It should be specifically noted that each of the buses of the multi-bus 114 of FIG. 3 consists of a different number of leads. For example, bus 130, over which the halt signal is supplied, consists of only a single lead, the write/read bus 132 can also consist of a single lead, the word address bus 134 requires a number of leads determined by the maximum number of word locations which will be accessed in the RAM of any given device. For example, if the maximum number of word locations to be accessed is 1024 then the word address bus 134 will consist of 10 leads. Similarly, the device address bus 136 will have a number of leads determined by the number of microprocessor devices to be accessed. The number of leads in bus 138 is determined by the maximum number of bits in each data word to be transferred between processors. The halt acknowledge bus 140 requires only a single lead.

The bus connector 106 (FIG. 3) and the bus connector 110, both shown in some detail, are of similar structure so that only one, e.g. bus 106, will be discussed in detail.

Figure 2:
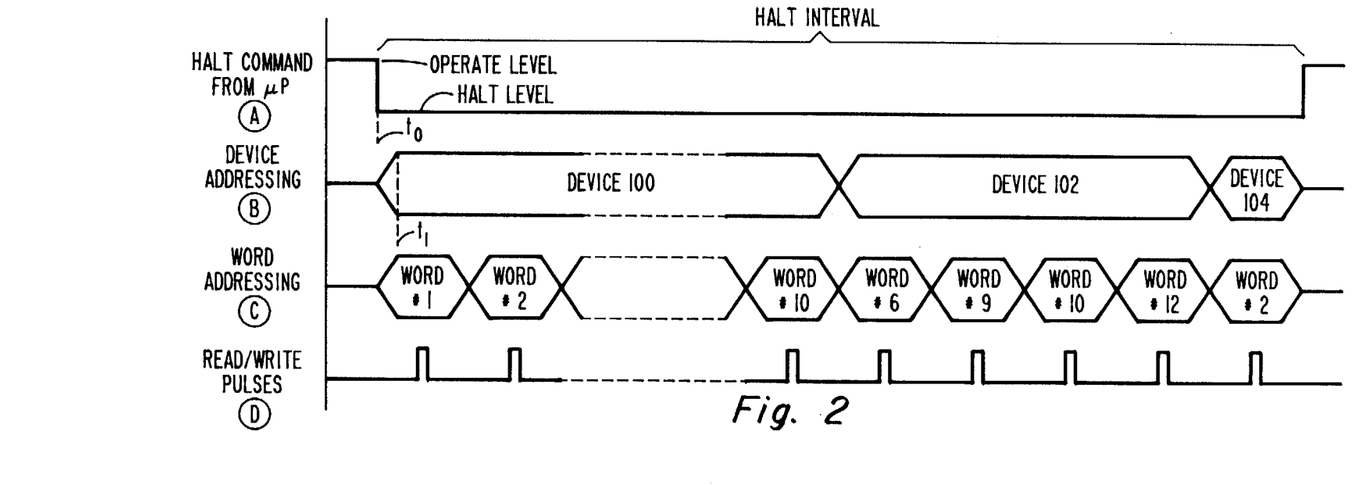
FIG. 2 shows timing waveforms employed in the operation of the structures of FIGS. 1, 3, 4 and 5.

When a given processor, such as processor 100 for example, is accessed a decoder 150 responds to the appropriate device address appearing on device address bus 136 to produce a high level signal on its output terminal 168. Such high level signal is supplied to the inhibit inputs 161 and 164 of AND gates 154 and 152 and also to a non-inhibiting input 162 of AND gate 156. AND gate 156 will thereby become primed to conduct and AND gates 152 and 154 will be disabled. More specifically, AND gate 156 will be primed to conduct data read from RAM 160 which will occur as follows. When one of the read/write pulses from waveform 2D is supplied to AND gate 152 there will be a low level output signal supplied therefrom since a high level signal from decoder 150 is being supplied to the inhibit input 164 of AND gate 152. Therefore, the output of AND gate 152 will in fact be a read signal and not a write signal so that data will be read from the accessed word locations of RAM 160 and supplied to data bus 138 via enabled AND gate 156 and then into the RAMs of the other devices, in a manner to be discussed later herein.

The particular word locations accessed in RAM 160 of device 100 are determined by the word addresses appearing on the word address bus 134 and supplied to RAM 160 through AND gate 158 which is enabled during the halt signal of timing waveform 2A. Such halt signal is supplied to the inhibit input 159 of AND gate 158. The halt signal is a low level signal so that AND gate 158, because of its inhibit input 159, inverts said low level signal to a high level signal, thereby priming AND gate 158 to permit the word address on bus 134 to pass therethrough and into the word address input 161 of RAM 160.

During the time that device 100 is being accessed the devices 102 and 104 are not being accessed so that the output of decoder 170, for example, is a low level signal which will disable AND gate 173 and enable AND gate 172, by virtue of the inhibit input 174 thereof, thus allowing data to flow from data bus 138 through enabled AND gate 172 and into RAM 178.

Simultaneously, during the halt period, the low level output of decoder 170 will enable AND gate 176 to permit the read/write signal on bus 132 to be passed therethrough and into the read/write input of RAM 178. Since such read/write signal is a high level signal the command is, in fact, a write command and the data on bus 138 will be written into the RAM 178, the data being that data read out of RAM 160 of device 100. It will be noted that AND gate 180 of bus connector 110 is enabled by the halt signal to pass the word addresses therethrough and to the word address terminal 182 of RAM 178.

A microprocessor such as the microprocessor of device 100 responds to a halt signal (waveform 2A) to generate a halt acknowledge signal which is supplied back to the device 100 via the halt acknowledge bus 140. The halt acknowledge signal from all microprocessors are logically OR'd on the halt acknowledge bus. If all microprocessors respond, the bus is "high" or "1"; if any one microprocessor fails to respond the halt acknowledge bus remains low. The controller does not begin its sequence of actions until all microprocessors have acknowledged the halt command. An alternative method is for the controller to use a "time-out" and begin its sequence after a fixed delay.

The bus controller 112 of FIG. 3 (and FIG. 4), supplies word addresses to the RAMS of the various devices in accordance with the requirements of the particular program being executed. It is to be understood that the particular program being executed is not a part of the invention. Such RAM word locations are a product of the program being executed and the contents of received data as, for example, range pulses produced in a radar system. The bus controller logic 112, which generates the various timing waveforms of FIG. 2 is shown in FIG. 4 which will be discussed below.

Figure 4:
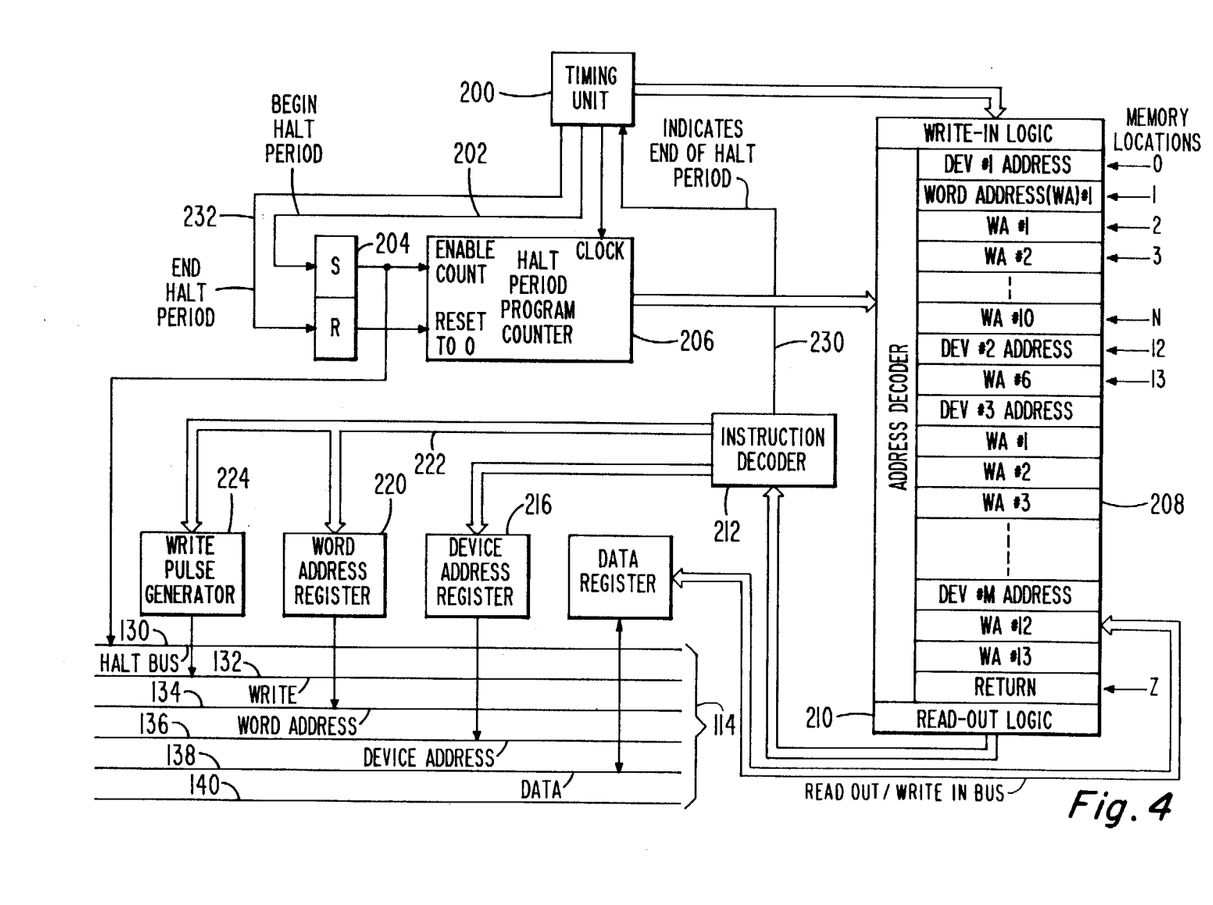
FIG. 4 is a block diagram of the bus controller.

Consider first the memory 208, which can be a random access memory (RAM), but preferably is ROM (read only memory), a typical example of the manner in which it is used is shown in FIG. 4.

During those periods of time other than the halt intervals each of the devices is processing information and storing the results thereof in predetermined memory locations in its own RAM. It is this information in each RAM device that is to be read therefrom and transmitted to corresponding word locations in the RAMs of the other processors in the system. As mentioned before, however, the specific word locations from which data is to be read from and supplied to the RAMs of the other devices in the system are not ordinarily the same for each device although the word locations to which the data is written in the remaining RAMS for any given accessed device are identical word locations.

Since the particular memory locations in each of the RAMs of the various devices in the system, from which data is to be read, is known, the device addresses and the memory locations in each RAM to be accessed can be word locations O through N of ROM 208. During each halt period, the halt period program counter 206 will step through the memory locations O-N of memory 208 to successively access each device. During the accessing of each device the contents of the desired word locations in RAM memory from which data is to be read are read and then written into the corresponding word locations of the RAMS of the remaining devices in the system.

Consider next the timing waveforms of FIG. 2 and the logic of FIG. 4 which is employed to generate such timing waveforms. A timing unit 200, which is shown as part of the bus controller 112 of FIG. 3 generates a signal on output lead 202 which defines the start of a halt period and corresponds to time $t_0$ of timing waveform 2A. As discussed above, the beginning of the halt period is determined by internal timing logic of 200 and is initiated typically every 10 milliseconds for approximately 1 millisecond. The flip-flop 204 becomes set in response to the negative transition of the halt signal of waveform 2A at time $t_0$ to enable the halt period of program counter 206 which then begins to access the word locations in memory 208 beginning at address 0. The contents of address 0 contains the address of device 100 (FIG. 3) which is read therefrom via readout logic 210 and supplied to instruction decoder 212. The instruction decoder 212 supplies such device address to device address register 216 after a short settling time $t_0-t_1$, as shown in waveform 2B. The address of device 100 will remain in register 216 during the immediately following time period the contents of the word locations of the RAM of device #1 (corresponding to device 100 of FIG. 3) which are to be accessed are, in fact, read therefrom.

Such word addresses are shown in memory locations 1, 2, 3-N in memory 208. When the program counter 206 points to memory location (address) 12 the address of device number #2 (corresponding to device 102 of FIG. 1), and which comprises the contents of address 12, is supplied via read-out logic 210 to instruction decoder 212. Instruction decoder 212 responds to the contents of address 12 (which is the address of device #2) to enter such address of device #2 into device register 216, thereby replacing the address of device #1. In the example shown in memory 208, the RAM of device #2 contains only a single word location whose contents must be read therefrom and written into the corresponding RAM word locations of the remaining devices (#3-#N) in the system.

It should be noted that the contents of the word locations accessed in memory 208 are, in fact, the addresses of word locations in the RAMS of the various devices, such as device 100 or 104 of FIG. 3.

As discussed above, any given device address entered into device address register 216 will access only one of the devices, as for example, device 100 of FIG. 3. The accessed device 100 will have the data contained in the memory locations accessed by the word addresses entered into the word address register 220 (FIG. 4) via bus 222. A write pulse generator 224 responds to the appearance of a word address on bus 222 to generate a write pulse which is shown in timing waveform 2D.

At the end of the accessing of all the devices in the system and the accessing of all of the word locations whose contents are to be transferred, a return instruction appears in memory location Z of memory 208. The instruction decoder 212 responds to such return signal to generate a signal on output lead 230 thereof indicating the end of the halt period. In response to such signal the timing unit 200 in turn generates an output signal on lead 232 which resets flip-flop 204. The resetting of flip-flop 204 disables the halt period program counter 206 and resets the count therein to 0 in preparation for the next halt period.

Figure 5:
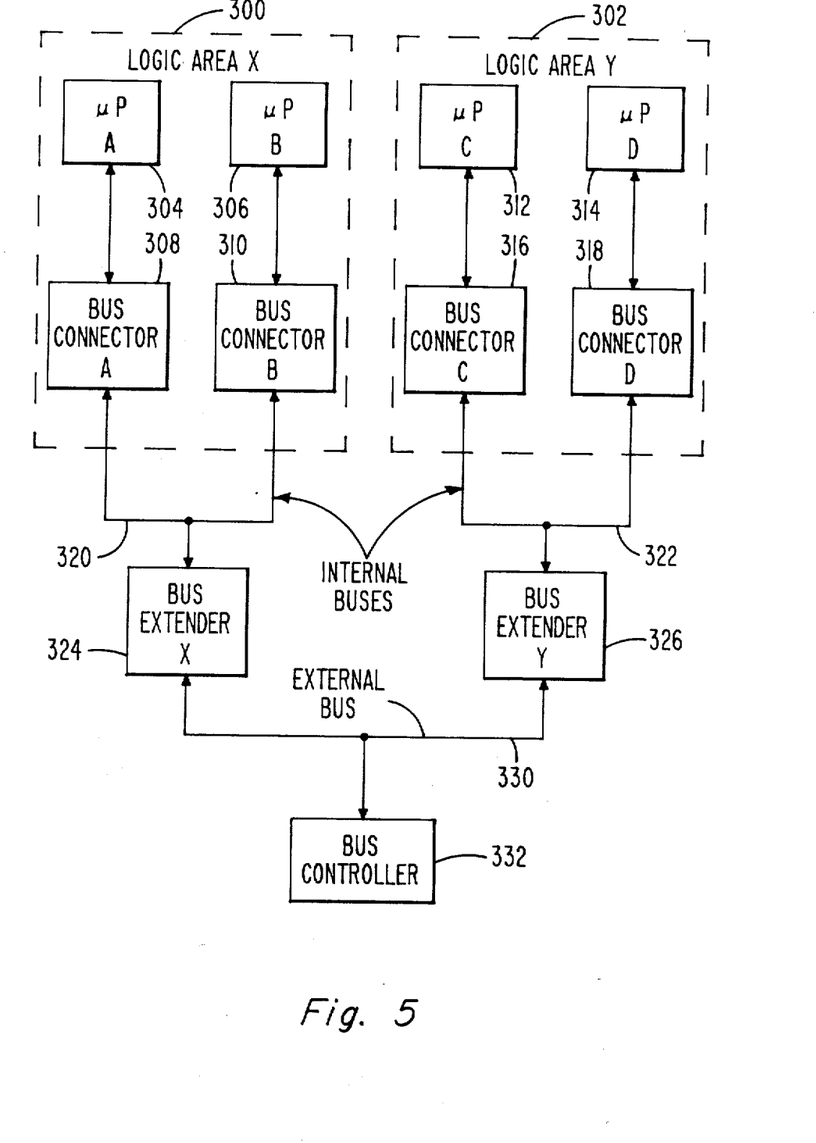
FIG. 5 is a block diagram of a more complex form of the invention employing bus extenders so that a plurality of groups of devices can be interconnected with a common bus controller.

A modified form of the invention is shown in FIG. 5 which includes the addition of bus extenders, such as bus extenders 324 and 326, to enable the placement of devices at greater physical distances apart than can be obtained without the use of bus extenders. More specifically, one group of devices, including processors 304 and 306, can be located in one logic area X within block 300 and another group of devices in another logic area Y within block 302, which can be physically located several hundred feet, for example, from logic area X.

Associated with each of the microprocessors 304, 306, 312 and 314 is a bus connector, such as bus connecters 308, 310, 316 and 318, which perform the same function as the bus connectors 106 and 110 of FIG. 3. The internal buses 320 and 322 of FIG. 5 correspond to the internal bus 114 of FIG. 3. Bus controller 332 corresponds to bus controller 112 of FIG. 3.

Bus extender 324 is essentially an amplifing device which amplifies the signals read from the RAMs of processors 304 or 306 of logic area 300, for example, to the remaining processors in the system, as for example, processors 312 and 314. The external bus 330 of FIG. 4, not employed in the architecture of FIG. 3, connects bus controller 332 to the two bus extenders 324 and 326 in the manner shown in more detail in FIG. 5.

Figure 6:
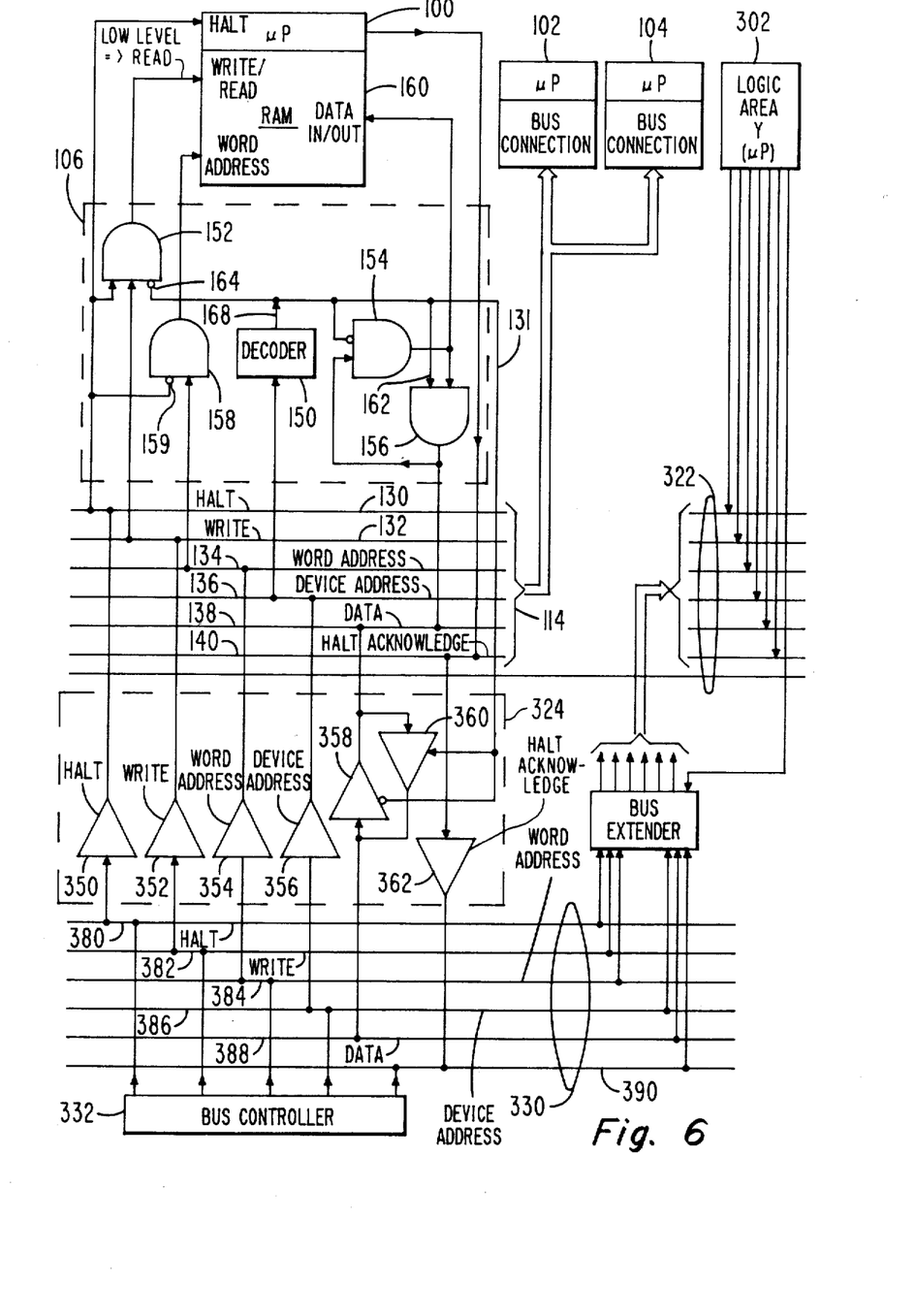
FIG. 6 is a more detailed block and logic diagram of the general block diagram of FIG. 4.

In FIG. 6, all of the logic shown above the horizontal dashed line 344 and within the bracket 346 at the top of the figure corresponds to the structure of FIG. 3 and is identified by corresponding reference characters. The logic within block 324 of FIG. 6 constitutes a typical implementation of the bus extender and corresponds to the bus extender 324 of FIG. 5. Block 326 of FIG. 6 corresponds to the bus extender 326 of FIG. 5. The group of leads 330 in FIG. 6 constitutes a more detailed showing of the external bus 330 of FIG. 5. The 6 leads 322 of FIG. 6 correspond to the internal bus 322 of FIG. 5 and the logic area 302 of FIG. 6 corresponds to the logic area 302 of FIG. 5.

Within bus extender 324 amplifier 350 amplifies the halt signal supplied from bus lead 130 to each of the devices, amplifier 352 amplifies the read/write pulses of waveform 2D supplied from bus lead 132, word address amplifier 354 and device address amplifier 356, respectively, amplify the word addresses and the device addresses supplied to the various devices from buses 134 and 136, and the halt acknowledge amplifier 362 amplifies the halt acknowledge signal. The two amplifiers 358 and 360 form a bi-directional amplifying arrangement for data flowing either to or from a device. More specifically, if the device 100 is being accessed to transmit the data from selected RAM locations of RAM 160, amplifier 360 in bus extender 324 will be enabled and amplifier 358 will be disabled by the output of decoder 150 via lead 131. Thus, the contents of the accessed locations in RAM 160 will pass through AND gate 156 in bus connector 106 and then through amplifier 360 to data bus 388 in the external bus 330.

In all of the other bus extenders the amplifiers corresponding to amplifier 360 will be disabled and the amplifiers corresponding to amplifier 358 will be enabled to permit the data to flow from data bus 388 in the external bus 330 into the RAMs of the remaining devices 102 and 104.

What is claimed is:

1. A computer system including a plurality of data processing stations each including a signal processing portion which interchanges data with a random access memory portion having a plurality of addressable word locations, and each of which also includes a signal processing interrupt function and an interrupt input terminal therefore, word location accessing logic means responsive to a word address signal to access a selected random access memory word location, read/write control logic for controlling the reading of data from and the writing of data into said random access memory, and a distributive bus system interconnecting said plurality of data processing stations, comprising:

a bus controller for generating, and a bus for distributing, a plurality of control signals including periodic halt signals for interrupting said signal processing of said data processing stations, a plurality of time sequential data processing station address signals occurring during each said halt signal, time sequential word address signals occurring during each said data processing station address signal, and read/write signals occurring during each said word address signal;

first coupling means coupled to said bus system and to each said data processing station for simultaneously coupling said halt signals to said interrupt input terminal of each said data processing station for halting signal processing for the duration of each said halt signal;

decoding means coupled to each of said data processing stations and to said bus system and responsive to said data processing station address signals, each of said decoding means generating a first output signal during those intervals in which that data processing station to which it is coupled is addressed and generating a second output signal during those intervals in which that data processing station to which it is coupled is not addressed;

first gating means coupled to each of said data processing stations, to each of said decoding means and to said bus system and responsive to the simultaneous occurrence of said halt signal, said read/write signal and said first output signal from said decoding means to supply a read signal to said read/write control logic, and responsive to the simultaneous occurrence of said halt signal, said read/write signal and said second output signal from said decoding means to supply a write signal to said read/write control logic whereby said random access memory portion of that data processing station which is addressed is enabled for reading and said random access memory portion of those data processing stations which are not addressed are enabled for writing;

second gating means coupled to each of said word location accessing logic means and to said bus system and responsive to the simultaneous occurrence of said halt signal and said word address siggic means and to said bus system and responsive to the simultaneous occurrence of said halt signal and said word address signals for accessing the corresponding random access memory word location whereby the word in the memory location so accessed is read from the random access memory portion of that data processing station which is addressed and the memory location so accessed in the random access memory of those data processing stations which are not addressed is made available for writing; and third gating means coupled to said random access memory portion of each of said data processing stations, to said decoding means and to said bus system and responsive to said decoding means for coupling each word read from said random access memory portion of that data processing station which is addressed to a particular portion of said bus system in response to said first output signal of said decoding means and for coupling each word on said particular portion of said bus system to said random access memory portion of those data processing stations which are not addressed for writing.

* * * * *

UNITED STATES PATENT AND TRADEMARK OFFICE
CERTIFICATE OF CORRECTION

PATENT NO. : 4,593,350

DATED : June 3, 1986

INVENTOR(S) : Renzo Doke Mitchell et al.

It is certified that error appears in the above-identified patent and that said Letters Patent is hereby corrected as shown below:

Column 6, line 22 "amplifing" should be --amplifying--

Column 8, lines 16-19 delete "siggic means and to said bus system and responsive to the simultaneous occurrence of said halt signal and said word address"

Signed and Sealed this

Nineteenth Day of August 1986

[SEAL]

Attest:

Attesting Officer

DONALD J. QUIGG

Commissioner of Patents and Trademarks